(12) United States Patent
Yokoyama et al.

(10) Patent No.: US 10,654,754 B2
(45) Date of Patent: May 19, 2020

(54) GYPSUM COMPOSITION FOR DRY-CURING COATING MATERIAL, GYPSUM-BASED COATING MATERIAL, AND CONSTRUCTION METHOD FOR GYPSUM-BASED COATING MATERIAL

(71) Applicant: YOSHINO GYPSUM CO., LTD., Tokyo (JP)

(72) Inventors: Itaru Yokoyama, Tokyo (JP); Yoshikazu Tanaka, Tokyo (JP)

(73) Assignee: YUSHINO GYPSUM CO., LTD., Tokyo (JP)

( * ) Notice: Subject to any disclaimer, the term of this patent is extended or adjusted under 35 U.S.C. 154(b) by 0 days.

(21) Appl. No.: 15/772,369

(22) PCT Filed: Dec. 7, 2016

(86) PCT No.: PCT/JP2016/086306
§ 371 (c)(1),
(2) Date: Apr. 30, 2018

(87) PCT Pub. No.: WO2017/099102
PCT Pub. Date: Jun. 15, 2017

(65) Prior Publication Data
US 2018/0319709 A1 Nov. 8, 2018

(30) Foreign Application Priority Data
Dec. 11, 2015 (JP) .................. 2015-242337

(51) Int. Cl.
| | | |
|---|---|---|
| *C04B 28/14* | (2006.01) | |
| *C04B 40/06* | (2006.01) | |
| *E04F 13/02* | (2006.01) | |
| *C04B 24/06* | (2006.01) | |
| *C04B 24/10* | (2006.01) | |
| *C04B 24/14* | (2006.01) | |
| *C04B 24/38* | (2006.01) | |
| *C04B 14/28* | (2006.01) | |
| *C04B 41/65* | (2006.01) | |
| *C04B 24/12* | (2006.01) | |
| *C04B 111/00* | (2006.01) | |
| *C04B 103/22* | (2006.01) | |
| *C04B 111/34* | (2006.01) | |

(52) U.S. Cl.
CPC .............. *C04B 28/14* (2013.01); *C04B 14/28* (2013.01); *C04B 24/06* (2013.01); *C04B 24/10* (2013.01); *C04B 24/123* (2013.01); *C04B 24/14* (2013.01); *C04B 24/38* (2013.01); *C04B 28/145* (2013.01); *C04B 40/0608* (2013.01); *C04B 41/65* (2013.01); *E04F 13/02* (2013.01); *C04B 2103/22* (2013.01); *C04B 2111/0062* (2013.01); *C04B 2111/00068* (2013.01); *C04B 2111/00086* (2013.01); *C04B 2111/00189* (2013.01); *C04B 2111/00482* (2013.01); *C04B 2111/00517* (2013.01); *C04B 2111/00689* (2013.01); *C04B 2111/34* (2013.01)

(58) Field of Classification Search
CPC ......... C04B 14/28; C04B 24/06; C04B 24/10; C04B 24/14; C04B 24/38; C04B 24/123; C04B 28/14; C04B 28/145; C04B 40/0608; C04B 41/65; C04B 2103/22; C04B 2111/00482; C04B 2111/00517; C04B 2111/00689; C04B 2111/00086; C04B 2111/00068; C04B 2111/00189; C04B 2111/0062; C04B 2111/34; E04F 13/02
See application file for complete search history.

(56) References Cited

U.S. PATENT DOCUMENTS

| | | | |
|---|---|---|---|
| 5,653,797 A | 8/1997 | Patel | |
| 5,779,786 A | 7/1998 | Patel | |
| 6,638,356 B2 * | 10/2003 | Ishibashi | ............... C04B 24/008 106/778 |
| 2008/0305252 A1 | 12/2008 | Cimaglio et al. | |
| 2012/0090508 A1 | 4/2012 | Groza et al. | |

(Continued)

FOREIGN PATENT DOCUMENTS

| | | | |
|---|---|---|---|
| CN | 104829202 A | * | 8/2015 |
| DE | 3048506 | | 7/1982 |

(Continued)

OTHER PUBLICATIONS

International Search Report, issued in the corresponding PCT application No. PCT/JP2016/086306, dated Jan. 24, 2017, 5 pages.
Indian Examination Report, issued in the corresponding Indian patent application No. 201817015763, dated Jul. 12, 2019, 5 pages, all the cited references being previously filed in the IES dated Apr. 30, 2018.
Extended European Search Report, issued in the corresponding European patent application No. 16872998.6, dated Jul. 2, 2019, 9 pages.
Korean Office Action, issued in the corresponding Korean patent application No. 10-2018-7017966, dated Nov. 7, 2019, 13 pages (including the machine translation).
Canadian Office Action, issued in the corresponding Canadian patent application No. 3004042 dated Jan. 9, 2020, 4 pages.
European Office Action, issued in the corresponding European patent application No. 16872998.6 dated Feb. 18, 2020, 9 pages.

*Primary Examiner* — Anthony J Green
(74) *Attorney, Agent, or Firm* — Hamre, Schumann, Mueller & Larson, P.C.

(57) ABSTRACT

There is provided a gypsum composition for a drying type coating material, the gypsum composition, when made into a gypsum-based coating material by addition of water, capable of forming a coating film in which color unevenness is suppressed even though the coating film is thin and smooth. This gypsum composition for a drying type coating material contains hemihydrate gypsum having a mean particle diameter of 50 μm or less, calcium carbonate having a mean particle diameter of 50 μm or less, and a setting retarder, wherein the gypsum composition has a content of calcium carbonate of 100 to 400 parts by mass and a content of the setting retarder of 0.1 parts by mass or more each based on 100 parts by mass of the hemihydrate gypsum.

20 Claims, 2 Drawing Sheets

(56) References Cited

U.S. PATENT DOCUMENTS

2015/0152011 A1\* 6/2015 Wan ................. C04B 28/14
                                                106/694
2018/0105466 A1\* 4/2018 Wilde ............... C04B 28/147

FOREIGN PATENT DOCUMENTS

| DE | 10159337 A1 | * | 6/2002 | ............ B23B 13/14 |
|----|-------------|---|--------|-------------------------|
| EP | 0496682 | | 7/1992 | |
| EP | 0602999 A1 | * | 6/1994 | ............ C04B 28/16 |
| FR | 729676 | | 7/1932 | |
| FR | 2990432 | | 11/2013 | |
| JP | 62-041748 | | 2/1987 | |
| JP | 08-060139 | | 3/1996 | |
| JP | 2004-315363 | | 11/2004 | |
| JP | 2009-249271 | | 10/2009 | |
| JP | 2011-518040 | | 6/2011 | |
| KR | 10-2011-0082857 | | 7/2011 | |
| KR | 10-2014-0009176 | | 1/2014 | |
| KR | 1020160080298 A | * | 7/2016 | |
| RO | 106555 B1 | * | 5/1993 | |
| WO | 2008/003672 | | 1/2008 | |
| WO | 2012/077523 | | 6/2012 | |

\* cited by examiner

GYPSUM COMPOSITION FOR DRY-CURING COATING MATERIAL, GYPSUM-BASED COATING MATERIAL, AND CONSTRUCTION METHOD FOR GYPSUM-BASED COATING MATERIAL

TECHNICAL FIELD

The present invention relates to a gypsum composition for a drying type coating material, a gypsum-based coating material, and a construction method for a gypsum-based coating material.

BACKGROUND ART

A wet construction method is known as a construction method for forming a coating film on surfaces of walls, floors, ceilings, and the like of a building with a coating material such as a plastering material. In the wet construction method, a wet coating material in the form of slurry is obtained by kneading a composition containing an inorganic powder such as mortar, lime plaster, gypsum, or diatomaceous earth as a principal with water, and a coating film is formed by a method such as coating the surface of an interior decoration wall, an exterior decoration wall, and the like of a building with the wet coating material using a trowel (trowel coating). Particularly as a coating material for finishing an interior decoration wall or an exterior decoration wall of a building, lime plaster-based coating materials and gypsum-based coating materials are widely used in order to secure design characteristics of wall surfaces. Generally, these wet coating materials are each made into a product as a composition in the form of a powder, and the product is used by being kneaded with water at a construction site.

For example, Patent Literature 1 discloses a method for suppressing color skipping in a colored lime plaster coating film by using a colored lime plaster composition containing lime, a white pigment, a colored pigment, a binder, and water for forming a coating film. Patent Literature 2 discloses a coating material for a wall surface, the coating material obtained by blending an inorganic powder having a particle diameter of 0.1 mm or less, gypsum having a particle diameter of 0.1 mm or less, a fiber having a wire diameter of 5 to 15 μm and a length of 3 to 10 mm, a water-soluble paste material, and a synthetic resin each in a predetermined ratio. Patent Literature 3 discloses invention relating to a dry gypsum composition and a gypsum-based coating material each containing hemihydrate gypsum, a pigment, and a predetermined content ratio of a particular habit modifier, wherein the dry gypsum composition and the gypsum-based coating material are controlled so that dihydrate gypsum to be obtained through hydration of the hemihydrate gypsum becomes a plate-like crystal having an aspect ratio of 1 to 9.

CITATION LIST

Patent Literature

Patent Literature 1: Japanese Patent Laid-Open No. 2004-315363
Patent Literature 2: Japanese Patent Laid-Open No. 2009-249271
Patent Literature 3: International Publication No. WO 2012077523

SUMMARY OF INVENTION

Technical Problem

As described in Patent Literature 2, a smooth surface is easily finished by the construction method of coating a wall surface with the lime plaster-based coating material using a trowel. Accordingly, in the case where a smooth coating film is formed by performing thin coating with a coating material, specifically by performing thin coating with a coating material so that the coating thickness is 3 mm or less, lime plaster-based coating materials rather than gypsum-based coating materials are generally used.

However, in the case where the lime plaster-based coating materials are used, lime plaster has a pH in an alkaline region, and besides, dust may scatter during working of applying a lime plaster-based coating material, and therefore working has to be conducted more carefully than usual considering safety for workers. On the other hand, there are advantages in using gypsum-based coating materials because it is easy to adjust the pH around a neutral region; there is an advantage from the viewpoint of the above-described safety; and the gypsum-based coating materials easily adhere to a substrate such as cloth (wall paper) or a gypsum board.

However, according to studies conducted by the present inventors, it has been found that when a so-called setting type gypsum-based coating material, in which hemihydrate gypsum undergoes hydration reaction, is used to perform thin coating so that the coating thickness is, for example, 3 mm or less, there is a tendency that color unevenness is liable to occur in a coating film formed through setting of the gypsum-based coating material.

Thus, the present invention intends to provide a gypsum composition for a drying type coating material, the gypsum composition, when made into a gypsum-based coating material by addition of water, capable of forming a coating film in which color unevenness is suppressed even though the coating film is thin and smooth.

Solution to Problem

In the case where thin coating is performed with a gypsum-based coating material, the process of forming a coating film accompanies both the process of setting through a hydration reaction of hemihydrate gypsum in the coating material and the process of setting through drying by absorption of water latent in the coating material by an adherend as a substrate or by evaporation of water latent in the coating material into the air. It is considered that when the amount of water necessary for the hydration reaction of the hemihydrate gypsum becomes deficient through the absorption of water in the coating material by the adherend as a substrate or through the evaporation of water in the coating material into the air before the hemihydrate gypsum in the coating material undergoes the hydration reaction, so-called "dry out", which refers to a phenomenon that unreacted hemihydrate gypsum is left in the coating material formed through setting of the gypsum-based coating material, is liable to occur. The present inventors have considered that in a coating film formed through a partial or non-uniform hydration reaction of the hemihydrate gypsum due to the dry out, the above-described color unevenness occurs between portions where the hemihydrate gypsum has reacted (dry out portions) and portions where the hemihydrate gypsum has not been reacted.

Thus, the present inventors have dared to study to make the occurrence of the hydration reaction of hemihydrate gypsum hard by changing the way of thinking apart from the setting type method in which a set film is formed through the hydration reaction of hemihydrate gypsum, which was considered as common general knowledge in the conventional gypsum-based coating materials. As a result, the present inventors have completed the present invention by finding that when a gypsum-based coating material obtained by adding water to a gypsum composition constituted so as to make the occurrence of the hydration reaction of hemihydrate gypsum hard is used, there is a tendency that the color unevenness is unexpectedly suppressed in a coating film formed from the gypsum-based coating material through setting of the gypsum-based coating material.

The present invention provides a gypsum composition for a drying type coating material, the gypsum composition comprising: hemihydrate gypsum having a mean particle diameter of 50 μm or less; calcium carbonate having a mean particle diameter of 50 μm or less; and a setting retarder, wherein the gypsum composition has a content of the calcium carbonate of 10 to 400 parts by mass and a content of the setting retarder of 0.1 parts by mass or more each based on 100 parts by mass of the hemihydrate gypsum.

Advantageous Effects of Invention

According to the present invention, a gypsum composition for a drying type coating material, the gypsum composition, when made into a gypsum-based coating material by addition of water, capable of forming a coating film in which color unevenness is suppressed even though the coating film is thin and smooth can be provided.

DESCRIPTION OF EMBODIMENTS

Hereinafter, embodiments according to the present invention will be described; however, the present invention is not limited to the following embodiments.

<Gypsum Composition for Coating Material>

As described above, as the results of the studies conducted by the present inventors, when a setting type gypsum-based coating material comprising hemihydrate gypsum is used to perform thin coating so that the coating thickness is 3 mm or less, it has been found that a coating film having color unevenness is liable to be formed. The present inventors have conducted studies on the cause of the color unevenness to conclude that the color unevenness occurs because the dry out, in which unreacted hemihydrate gypsum is left in a coating film formed through setting of a gypsum-based coating material, is liable to occur through absorption of water in the coating material by an adherend as a substrate or through evaporation of water in the coating material into the air, wherein the adsorption or the evaporation occurs because of thin coating. It is considered that in a coating film formed through a partial or non-uniform hydration reaction of the hemihydrate gypsum due to this dry out, the above-described color unevenness occurs between portions where the hemihydrate gypsum has reacted (dry out portions) and portions where the hemihydrate gypsum has not been reacted.

It is considered that this, the above-described color unevenness, can occur for a gypsum composition in which the initial setting time of the hydration reaction of hemihydrate gypsum in the coating material is faster than the time required to complete dry set of the coating material (hereinafter, also referred to as "dry set completion time") through the absorption of the water in the coating material by the adherend as a substrate or through the evaporation of the water into the air when water is added to the gypsum composition for a coating material to prepare the gypsum-based coating material.

The gypsum-based coating materials have conventionally been used as a setting type coating material which is set through a phase change from hemihydrate gypsum to dihydrate gypsum caused by adding water to the hemihydrate gypsum to allow the hydration reaction to occur considering the adhesiveness to a substrate and the strength of a coating film. However, the present inventors have dared to study to make the occurrence of the hydration reaction of hemihydrate gypsum hard by changing the way of thinking apart from the setting type method, which was considered as common general knowledge in the conventional gypsum-based coating materials, and present inventors have attempted to use a gypsum composition constituted so as to make the occurrence of the hydration reaction of hemihydrate gypsum hard. As a result, it has been made clear that a gypsum-based coating material obtained by adding water to the gypsum composition unexpectedly makes it possible to form a coating film which shows a sufficient adhesiveness to substrates and in which color unevenness is suppressed.

It is to be noted that in the present specification, the gypsum composition constituted so as to make the occurrence of the hydration reaction of hemihydrate gypsum hard means a gypsum composition in which when water is added to the gypsum composition to obtain a gypsum-based coating material, the dry set completion time of the coating material through the absorption of the water in the coating material by the adherend as a substrate or through the evaporation of the water into the air is faster than the initial setting time of the hydration reaction of the hemihydrate gypsum. In the case where the setting time completion time is faster than the initial setting time of the hydration reaction, the hydration reaction is suppressed because water in an amount that is necessary for the hydration reaction does not exist around the hemihydrate gypsum.

That is, the gypsum composition for a coating material according to one embodiment of the present invention (hereinafter, sometimes simply referred to as "gypsum composition") comprises: hemihydrate gypsum having a mean particle diameter of 50 μm or less; calcium carbonate having a mean particle diameter of 50 μm or less; and a setting retarder. This gypsum composition has a content of calcium carbonate of 10 to 400 parts by mass and a content of the setting retarder of 0.1 parts by mass or more based on 100 parts by mass of hemihydrate gypsum. This gypsum composition is used for a drying type gypsum-based coating material.

The gypsum composition according to the present embodiment is suitably used as a gypsum-based coating material comprising water. The gypsum composition, when made into a gypsum-based coating material by addition of water, makes it possible to form a coating film from the gypsum-based coating material, and more specifically, the gypsum composition makes it possible to form a coating film by applying the gypsum-based coating material on an adherend and dry-setting the applied gypsum-based coating material.

The gypsum composition comprises hemihydrate gypsum and calcium carbonate each having a mean particle diameter of 50 µm or less, and a particular amount of a setting retarder, and therefore makes it possible to form a thin and smooth coating film having a high surface hardness. Thus, the use of the gypsum-based coating material that is prepared by adding water to the gypsum composition makes it possible to form a coating film that is excellent in scratch resistance and impact resistance. Accordingly, for example, when a coating film is formed by applying the gypsum-based coating material that is prepared using the gypsum composition on a wall surface and dry-setting the applied gypsum-based coating material, a wall surface that is excellent in scratch resistance and impact resistance can be formed. In addition, it is inferred that a coating film having a high surface hardness even though the coating film is thin and smooth can be obtained because when the hemihydrate gypsum and calcium carbonate each having a mean particle diameter of 50 µm or less are contained in a particular ratio, these act synergistically.

Further, the gypsum composition according to the present embodiment comprises 0.1 parts by mass or more of a setting retarder based on 100 parts by mass of hemihydrate gypsum, and therefore the hydration reaction of hemihydrate gypsum in the gypsum composition is suppressed. Thus, the use of the gypsum composition according to the present embodiment can suppress a partial or non-uniform hydration reaction of hemihydrate gypsum and makes it possible to form a coating film in which the hemihydrate gypsum is retained almost entirely or almost uniformly. Accordingly, by the gypsum composition according to the present embodiment, color unevenness attributable to the partial or non-uniform hydration reaction of hemihydrate gypsum can be suppressed even though the coating film is thin and smooth.

As described above, the gypsum composition according to the present embodiment is constituted so that when water is added to the gypsum composition, the hydration reaction of hemihydrate gypsum in the gypsum composition is suppressed, or more preferably, when water is added to the gypsum composition, the hydration reaction is not allowed to occur. This constitution can also be specified by structural analysis using X-ray diffraction or by the initial setting time of the hydration reaction as described below.

When hemihydrate gypsum ($CaSO_4 \cdot \frac{1}{2}H_2O$) undergoes the hydration reaction, the hemihydrate gypsum changes into dihydrate gypsum ($CaSO_4 \cdot 2H_2O$). It is known that in an X-ray diffraction pattern, a clear diffraction peak appears at a diffraction angle of 11 to 12° for dihydrate gypsum, and a clear diffraction peak appears at a diffraction angle of 14 to 15° for hemihydrate gypsum. From this already-known information and the powder X-ray diffraction of a coating film obtained by applying a kneaded product of the gypsum composition and water and setting the kneaded product applied, whether or not the gypsum composition is constituted so that the hydration reaction of hemihydrate gypsum in the gypsum composition is suppressed (preferably, so that the initial setting time of the hydration reaction is slower than the dry set completion time) can be checked.

That is, it is preferable that the gypsum composition according to the present embodiment show a diffraction peak originating from hemihydrate gypsum, which was contained in the gypsum composition, and do not show a diffraction peak originating from dihydrate gypsum based on the hydration reaction of the hemihydrate gypsum in the powder X-ray diffraction of a coating film obtained by adding water to the gypsum composition and dry-setting the resultant mixture. In the present specification, the term "diffraction peak originating from dihydrate gypsum based on the hydration reaction of hemihydrate gypsum" means a diffraction peak originating from dihydrate gypsum produced through the hydration reaction of hemihydrate gypsum contained in the gypsum composition before the coating film is obtained. In the gypsum composition (and gypsum-based coating material) according to one embodiment of the present invention, dihydrate gypsum may be contained for the purpose of, for example, using it as a filler or the like. In this case, a diffraction peak originating from dihydrate gypsum, which was originally contained in the gypsum composition, can be shown in the powder X-ray diffraction of a coating film obtained by adding water to the gypsum composition. Accordingly, checking the constitution using the above-described powder X-ray diffraction can be conducted when the gypsum composition in which dihydrate gypsum is not blended is used, or, in the case of the gypsum composition in which dihydrate gypsum is blended, when the gypsum composition from which the dihydrate gypsum is removed is used. Hereinafter, with respect to the diffraction peaks in the powder X-ray diffraction of the gypsum composition (gypsum-based coating material) according to one embodiment of the present invention, description will be made in the case where analysis is conducted using the gypsum composition not containing dihydrate gypsum (such as gypsum composition in which dihydrate gypsum is not blended or gypsum composition from which dihydrate gypsum is removed). It is to be noted that the measurement of the powder X-ray diffraction can be conducted under conditions described in Examples, which will be described later.

On the other hand, as in the case where thin coating is performed with a conventional setting type gypsum-based coating material, in the case where the dry out occurs in a coating film, both the diffraction peak originating from hemihydrate gypsum and the diffraction peak originating from dihydrate gypsum based on the hydration reaction of the hemihydrate gypsum appear in the powder X-ray diffraction of a coating film that is formed by setting a mixture of a conventional gypsum composition and water. In addition, as in the case where thick coating is performed with a conventional setting type gypsum-based coating material, in the case where the dry out hardly occurs and dihydrate gypsum produced through the hydration reaction of hemihydrate gypsum is formed almost all over the coating film, the diffraction peak originating from hemihydrate gypsum does not appear, and the diffraction peak originating from the dihydrate gypsum appears.

Further, by measuring the initial setting time of the hydration reaction that occurs when water is added to the gypsum composition, whether or not the gypsum composition is constituted so that the hydration reaction of hemihydrate gypsum in the gypsum composition is suppressed (preferably, so that the initial setting time of the hydration reaction is slower than the dry set completion time) can also be checked. That is, in the gypsum composition according to the present embodiment, the initial setting time of the hydration reaction that occurs when water is added to the gypsum composition is 24 hours or longer. The initial setting time of the hydration reaction is measured in the same manner as in JIS A 6904 except that the normal consistency described in JIS A 6904 is set at a penetration depth of 20±2 mm, and the initial setting as referred to in JIS A 6904 is measured as the initial setting time of the hydration reaction in the present specification. In the case where the initial setting time of the hydration reaction is 24 hours or longer (more preferably 48 hours or longer), when the gypsum-based coating material is obtained by adding water in an amount that is usually used to a gypsum composition, water in the gypsum-based coating material is absorbed by an adherend before the hydration reaction starts, or water in the gypsum-based coating material evaporates into the air, so that a coating film is easily formed through dry set of the gypsum-based coating material.

It is to be noted that the term "thin coating" in the present specification refers to application with a coating thickness of about 3 mm or less (for example, 0.5 to 3 mm) considering the description on the coating thicknesses of thin coating materials and thick coating materials in "Coating materials for textured finishes of buildings" of JIS A 6909. In addition, similarly, the term "thick coating" refers to application with a coating thickness of about more than 3 mm (for example, 4 to 10 mm). Further, the term "mean particle diameter" in the present specification refers to a volume mean diameter (MV) that is measured using a particle size distribution measurement apparatus making used of a laser diffraction/scattering method. Next, the constitution of the gypsum composition according to the present embodiment will be described in more detail for each component in the gypsum composition according to the present embodiment separately.

Hemihydrate gypsum is a ½ hydrate of calcium sulfate [$CaSO_4 \cdot \frac{1}{2}H_2O$] and is also called calcined gypsum. In the present specification, the "hemihydrate gypsum" includes α-type hemihydrate gypsum and β-type hemihydrate gypsum and also includes type III anhydrous gypsum ($CaSO_4$) because it easily changes into hemihydrate gypsum by adsorbing water in the air. As raw material gypsum for the hemihydrate gypsum, any of natural products (such as bassanite), by-product gypsum, and waste gypsum can be used. Part or the whole of the raw material gypsum to be contained in the gypsum composition according to the present embodiment is preferably waste gypsum from the viewpoint of the production cost, the facilitation of recycling, the protection of the environment, and the like.

In the gypsum composition according to the present embodiment, any one or both of the α-type hemihydrate gypsum and the β-type hemihydrate gypsum each obtained through calcination in the air or water (including water vapor) are preferably used as hemihydrate gypsum, and a mixture thereof is also preferably used. The β-type hemihydrate gypsum is more preferably used from the viewpoint of easily adjusting the mean particle diameter of the hemihydrate gypsum to 50 μm or less. It is to be noted that the α-type hemihydrate gypsum can be produced, for example, by calcining dihydrate gypsum, such as natural gypsum, under pressure in water or water vapor using an autoclave. In addition, the β-type hemihydrate gypsum can be produced by calcining dihydrate gypsum, such as natural gypsum, under normal pressure in the air.

To form a smooth coating film using the gypsum-based coating material obtained by adding water to the gypsum composition according to the present embodiment, hemihydrate gypsum having a mean particle diameter of 50 μm or less is used. When hemihydrate gypsum having a mean particle diameter of more than 50 μm is used, the surface of a coating film formed through dry set of the gypsum-based coating material obtained by adding water to the gypsum composition may become rough, and the surface hardness may become lowered to make the surface liable to be scratched.

Hemihydrate gypsum preferably has a mean particle diameter of 40 μm or less, more preferably 30 μm or less from the viewpoint of forming a further smooth surface. The lower limit of the mean particle diameter of hemihydrate gypsum is not particularly limited, but hemihydrate gypsum preferably has a mean particle diameter of 1 μm or more, more preferably 10 μm or more from the viewpoint of pulverization facilities and cost.

To form a smooth coating film using a gypsum-based coating material obtained by adding water to the gypsum composition according to the present embodiment, calcium carbonate having a mean particle diameter of 50 μm or less is used in the gypsum composition. When calcium carbonate having a mean particle diameter of more than 50 μm is used, the surface of a coating film formed through dry set of the gypsum-based coating material may become rough, and the surface hardness may become lowered to make the surface liable to be scratched. When both calcium carbonate and the previously described hemihydrate gypsum each to be contained in the gypsum composition have a mean particle diameter of 50 μm or less, it becomes possible to form a smooth coating film having a high surface hardness.

Calcium carbonate preferably has a mean particle diameter of 40 μm or less, more preferably 30 μm or less from the viewpoint of forming a further smooth coating film. The lower limit of the mean particle diameter of calcium carbonate is not particularly limited, but it is preferably 0.1 μm or more, more preferably 1 μm or more, and still more preferably 10 μm or more from the viewpoint of pulverization facilities and cost.

The content of calcium carbonate in the gypsum composition is 10 to 400 parts by mass based on 100 parts by mass of hemihydrate gypsum. When the content of calcium carbonate is less than 10 parts by mass based on 100 parts by mass of hemihydrate gypsum, the surface of a coating film formed through dry set of the gypsum-based coating material obtained by adding water to the gypsum composition becomes liable to be rough. It is considered that this is because when the content of hemihydrate gypsum becomes too large relative to the content of calcium carbonate, the gypsum-based coating material obtained by adding water to the gypsum composition becomes sticky in coating an adherend with the gypsum-based coating material by trowel coating, so that the gypsum-based coating material becomes hard to separate from the trowel.

On the other hand, when the content of calcium carbonate exceeds 400 parts by mass based on 100 parts by mass of hemihydrate gypsum, the surface of a coating film formed through dry set of the gypsum-based coating material obtained by adding water to the gypsum composition may become rough, and the coating film may have a low surface hardness and may be liable to be scratched. It is considered that this is because when an adherend is coated by trowel coating with the gypsum-based coating material obtained by adding water to a gypsum composition having a content of calcium carbonate exceeding 400 parts by mass, the surface side of a coating film becomes liable to be harder in the process in which the coating film is formed through dry set of the gypsum-based coating material to bring about deviation in the way how the gypsum-based coating material is set, so that waves produced on the surface of the coating film by a trowel in performing trowel coating are difficult to disappear even when the waves are pressed by the trowel.

The content of calcium carbonate in the gypsum composition according to the present embodiment is preferably 10 to 300 parts by mass, more preferably 10 to 200 parts by mass based on 100 parts by mass of hemihydrate gypsum from the viewpoint of obtaining a smooth coating film having a high surface hardness.

In the gypsum composition according to the present embodiment, a setting retarder is contained in such an amount that the dry set completion time is faster than the initial setting time of the hydration reaction of the gypsum-based coating material in order to suppress the hydration reaction of hemihydrate gypsum. For example, in the case where a decomposition product of protein is used as the setting retarder, the setting retarder is contained in the gypsum composition in a ratio of 0.1 parts by mass or more to 100 parts by mass of hemihydrate gypsum. When the content of the setting retarder is less than 0.1 parts by mass based on 100 parts by mass of hemihydrate gypsum, there is a possibility that hydration reaction occurs in part of hemihydrate gypsum. As a result, in this case, there is a possibility that color unevenness attributable to the partial or non-uniform hydration reaction of hemihydrate gypsum occurs in a coating film formed through setting of the gypsum-based coating material obtained by adding water to the gypsum composition.

The upper limit of the content of the setting retarder is not particularly limited, but the amount with which the hydration reaction of hemihydrate gypsum can be suppressed is enough, and when the amount is too large, it becomes a cause for an increase in cost, and there is a possibility that discoloration occurs in a part of a coating film in the case where the setting retarder itself is colored. From these viewpoints, the content of the setting retarder is preferably 15 parts by mass or less, more preferably 10 parts by mass or less, and still more preferably 2 parts by mass or less based on 100 parts by mass of hemihydrate gypsum. Accordingly, the content of the setting retarder in the gypsum composition is preferably 0.1 to 15 parts by mass, more preferably 0.1 to 10 parts by mass, and still more preferably 0.1 to 2 parts by mass based on 100 parts by mass of hemihydrate gypsum. The content of the setting retarder in the gypsum composition is more preferably 0.2 parts by mass or more based on 100 parts by mass of hemihydrate gypsum from the viewpoint of making it easy to further suppress the hydration reaction of hemihydrate gypsum.

It is to be noted that the mean particle diameter of the setting retarder is not particularly limited, but a setting retarder having a small particle diameter among the setting retarders is preferable, and specifically, the setting retarder preferably has a mean particle diameter of 50 μm or less, and the setting retarder more preferably has a mean particle diameter equal to or smaller than the mean particle diameter of the hemihydrate gypsum and of the calcium carbonate.

As the setting retarder, at least one selected from the group consisting of citric acid, succinic acid, acetic acid, malic acid, ethylenediaminetetraacetic acid, diethylenetriaminepentaacetic acid, and salts thereof, and sucrose, starch, and decomposition products of protein can be used. Examples of the ion that constitutes a salt in citric acid salts, succinic acid salts, acetic acid salts, malic acid salts, ethylenediaminetetraacetic acid salts, and diethylenetriaminepentaacetic acid salts include: metal ions such as a sodium ion, a potassium ion, a lithium ion, a calcium ion, and a magnesium ion; and organic ammonium ions. As the decomposition product of protein, a product obtained by subjecting animal-derived and/or plant-derived protein to hydrolysis with hydrochloric acid or the like, and a product obtained by decomposing animal-derived and/or plant-derived protein with an enzyme such as protease can be used. For example, a decomposition product of protein, such as peptone, gelatin, keratin, casein, calcium caseinate, egg albumin, γ-globulin, or a mixture thereof, can be used. Examples of commercially available products among such setting retarders include "PLAST RETARD PE", trade name, manufactured by SICIT 2000 S.p.A.

The conventional gypsum-based coating materials have been used as a setting type coating material which uses hemihydrate gypsum and is set through a phase change from hemihydrate gypsum to dihydrate gypsum by adding water to the coating material to allow the hydration reaction of hemihydrate gypsum to occur. In such conventional setting type gypsum-based coating materials, even if a setting retarder is used at a stage prior to application onto an adherend so that hemihydrate gypsum will not undergo hydration reaction, it is necessary to blend an additive, such as setting accelerator, that accelerates the hydration reaction in order to allow the hemihydrate gypsum to undergo the hydration reaction after the application. In contrast, the gypsum composition according to the present embodiment is constituted so that the hydration reaction of hemihydrate gypsum is suppressed, and it is used for a drying type gypsum-based coating material. Therefore, it is preferable that the gypsum composition according to one embodiment of the present invention be substantially free of a setting accelerator. The gypsum composition that is substantially free of a setting accelerator can be checked by not showing a clear diffraction peak originating from dihydrate gypsum based on the hydration reaction of hemihydrate gypsum in the powder X-ray diffraction of a coating material formed from a mixture of the gypsum composition and water.

The gypsum composition according to the present embodiment is a composition comprising the previously described hemihydrate gypsum and calcium carbonate as main components. Specifically, the total content ratio (% by mass) of hemihydrate gypsum and calcium carbonate in the gypsum composition is preferably 50% by mass or more, more preferably 60% by mass or more, and still more preferably 70% by mass or more based on the total mass of the solid contents in the gypsum composition. In addition, each content ratio (% by mass) of hemihydrate gypsum, calcium carbonate, and the setting retarder based on the total mass of the solid contents in the gypsum composition can be set within the following ranges on the premise of the relationship among the previously described contents (parts by mass). That is, the content ratio of hemihydrate gypsum in the solid contents of the gypsum composition is preferably within a range of 18 to 90% by mass, more preferably within a range of 20 to 90% by mass. In the solid contents of the gypsum composition, the content ratio of calcium carbonate is preferably within a range of 8 to 80% by mass, more preferably within a range of 8 to 70% by mass, and the content ratio of the setting retarder is preferably within a range of 0.02 to 8% by mass.

Besides the above-described components, various additives can be contained in the gypsum composition according to the present embodiment within a range where the object of the present invention is impaired. Examples of the additives include a paste, a colorant, a thickener, an antifoaming agent, a setting accelerator, a filler, an aggregate, a weight reducing agent, a water reducing agent, a water repellent, a water repellent auxiliary, a formaldehyde catcher agent, a foaming agent, an antifreezing agent, an antifungal agent, a rust-preventive agent, an antiseptic agent, an antibacterial agent, a germicide, a viscosity modifier, a plasticizer, a lubricant, a sliding agent, a pH adjuster, and a moisture absorbing and desorbing material.

A paste is preferably contained in the gypsum composition according to the present embodiment. When the gypsum composition comprises a paste, in the case where a coating film is formed by applying the gypsum-based coating material prepared by adding water to the gypsum composition on an adherend and dry-setting the applied coating material, the gypsum composition comprising a paste improves the tightness of the coating film and the adhesiveness to the adherend, thereby making it possible to enhance the smoothness and the surface hardness.

Examples of the paste include polyvinyl alcohol; copolymers of a vinyl ester and an ethylene monomer such as an ethylene-vinyl acetate (EVA) copolymer, an ethylene-vinyl versatate copolymer, and a vinyl acetate-vinyl versatate copolymer; polyacrylic acid; a vinyl acetate-acrylic copolymer; a styrene-acrylic copolymer; a styrene-butadiene copolymer; a vinyl acetate-vinyl versatate-acrylic terpolymer; a vinyl acetate-vinyl versatate-maleic acid terpolymer; and an acrylic terpolymer. One or more of these pastes can be used. As the paste, polyvinyl alcohol, acrylic-based resins, and vinyl acetate-based resins are preferable. The content of the paste in the gypsum composition is preferably 1 to 10% by mass based on the total mass of the gypsum composition.

Hemihydrate gypsum and calcium carbonate are white in color, and therefore from a gypsum-based coating material prepared using the gypsum composition according to the present embodiment, a white coating film like lime plaster can be formed, and, for example, a white wall surface like lime plaster can be formed. On the other hand, in the case where the coating film is intended to be made to have a color other than white, a colorant can be contained in the gypsum composition. There are mainly two types of colorants of dyes and pigments, but pigments are preferably used.

As the pigment, inorganic pigments and organic pigments having various hues can be used. The inorganic pigment is not particularly limited, and examples thereof include zinc oxide, iron oxide, titanium dioxide, chromium oxide, aluminum hydroxide, yellow iron oxide, chrome yellow, zinc chromate, talc, ultramarine, lead white, carbon black, and phosphoric acid salts. In addition, the organic pigment is not particularly limited, and examples thereof include azo-based pigments, nitro-based pigments, nitroso-based pigments, phthalocyanine pigments, and condensed polycyclic pigments. Moreover, lake pigments can also be used. The content of the pigment in the gypsum composition can be set appropriately according to the desired hue (brightness, chromaticity, and saturation).

A thickener can be contained in the gypsum composition according to the present embodiment for the purpose of improving thixotropy of the gypsum-based coating material. Examples of the thickener include cellulose-based thickeners, polyacrylamides, pregelatinized starches, starch derivatives, and clays such as attapulgite, meerschaum, montmorillonite, and bentonite. Among these, cellulose-based thickeners are preferable. Suitable specific examples of the cellulose-based thickeners include hydroxyethyl cellulose, ethyl hydroxyethyl cellulose, methyl hydroxypropyl cellulose, methyl hydroxyethyl cellulose, hydroxypropyl methyl cellulose, methyl cellulose, and carboxymethyl cellulose, and salts thereof. One or more of these cellulose-based thickeners can be used. The content of the thickener in the gypsum composition is preferably 0.01 to 2% by mass based on the total mass of the gypsum composition.

An antifoaming agent can be contained in the gypsum composition according to the present embodiment for the purpose of preventing streaks due to trowel coating in applying the gypsum-based coating material on an adherend and enhancing smoothness. As the antifoaming agent, for example, silicone-based, alcohol-based, and polyether-based antifoaming agents can be used, and such antifoaming agents can be used singly, or two or more thereof can be used in combination. With respect to these antifoaming agents, publicly known antifoaming agents including synthetic substances, plant-derived natural substances, and the like can be used. The content of the antifoaming agent in the gypsum composition is preferably 0.01 to 1% by mass based on the total mass of the gypsum composition.

The gypsum composition according to the present embodiment can be made to take the form of a powder, a tablet, a lump, and the like. Respective components of hemihydrate gypsum, calcium carbonate, the setting retarder, and the like contained in the gypsum composition may be used by being integrated as the single form of a mixture or as the single form of an agent, or the respective components may be separately used as a set (kit).

Of the above-described forms, the gypsum composition is preferably in the form of a powder (aggregate of powders). In the case where the gypsum composition takes the form of a powder, it becomes possible to prepare the gypsum-based coating material in the form of slurry (liquid) easily by adding water to the gypsum composition at a site where the coating material is applied on an adherend. When the gypsum composition is prepared in the form of a powder in advance, water is then added to the gypsum composition to prepare the gypsum-based coating material in applying the gypsum-based coating material, or preferably immediately before applying the gypsum-based coating material on an adherend, and the gypsum-based coating material thus prepared is used, the hydration reaction of hemihydrate gypsum in the gypsum composition is further easily prevented. Therefore, color unevenness in a coating film formed through setting of the coating material is further easily suppressed.

<Gypsum-Based Coating Material>

In the present specification, a gypsum composition comprising water is called a gypsum-based coating material. That is, the gypsum-based coating material according to one embodiment of the present invention comprises: hemihydrate gypsum having a mean particle diameter of 50 µm or less; calcium carbonate having a mean particle diameter of 50 µm or less; a setting retarder; and water. This gypsum-based coating material has a content of calcium carbonate of 10 to 400 parts by mass and a content of the setting retarder of 0.1 parts by mass or more based on 100 parts by mass of hemihydrate gypsum.

The gypsum-based coating material according to the present embodiment can be made to take the form of slurry (liquid), paste, gel, and the like. Among these, the gypsum-based coating material is preferably in the form of slurry (liquid) so that the gypsum-based coating material can be applied as it is on an adherend. In the case where the gypsum-based coating material according to the present embodiment is distributed as the gypsum-based coating material comprising water, a reaction terminator is preferably contained in the gypsum-based coating material in order to suppress the hydration reaction of hemihydrate gypsum at a stage before use.

The use of a so-called ready mixed type gypsum-based coating material, in which water and a reaction terminator are contained in advance at a stage before the use of the coating material as described above, has an advantage that working of adding water to a gypsum composition can be omitted at a site where the coating material is applied on an adherend. It is to be noted that, if necessary, a reaction initiator can also be added to the ready mixed type gypsum-based coating material at the time of use. In addition, since the ready mixed type gypsum-based coating material comprises water, there is a possibility that part of hemihydrate gypsum undergoes the hydration reaction before applying the coating material with the lapse of time and a possibility that the hydration reaction occurs partially in the coating material when the coating material is applied because of the reason that the characteristics of the gypsum composition have changed during storage, or because of other reasons. Therefore, the gypsum composition according to one embodiment of the present invention is preferably in the form of a powder as described previously.

The content of water in the gypsum-based coating material is not particularly limited and can be determined appropriately according to the application. For example, the gypsum-based coating material preferably comprises 30 to 60 parts by mass of water based on 100 parts by mass of the total amount of hemihydrate gypsum, calcium carbonate, and the setting retarder. In addition, the mixing water ratio is preferably 30 to 60% by mass based on the solid content of the gypsum composition. The gypsum-based coating material preferably has a pH of 7 or more and less than 9 (around neutral pH), more preferably 7 or more and 8 or less, and still more preferably 7 or more and less than 8 (around neutral pH). In the present specification, the pH of a coating material is a value measured at 25° C. A pH adjuster can be appropriately added in adjusting the pH of the gypsum-based coating material. As the pH adjuster, for example, acids such as hydrochloric acid and sulfuric acid, and bases such as sodium hydroxide, potassium hydroxide, and calcium hydroxide can be used.

The gypsum-based coating material according to the present embodiment uses the previously described gypsum composition and therefore can form a coating film in which the hydration reaction of hemihydrate gypsum is suppressed, and specifically, a coating film in which the state of hemihydrate gypsum (hydration numbers of calcium sulfate) is almost kept can be formed. Accordingly, from the gypsum-based coating material, a coating film in which color unevenness attributable to the partial or non-uniform hydration reaction of hemihydrate gypsum is suppressed can be formed. It is preferable that the gypsum-based coating material according to the present embodiment show a diffraction peak originating from hemihydrate gypsum, which was contained in the gypsum composition, and do not show a diffraction peak originating from dihydrate gypsum based on the hydration reaction of the hemihydrate gypsum in the powder X-ray diffraction of a coating film obtained by dry-setting the gypsum-based coating material. Further, in the gypsum composition according to the present embodiment, the initial setting time of the hydration reaction measured in accordance with JIS A 6904 described previously is preferably 24 hours or longer.

Since both hemihydrate gypsum and calcium carbonate each contained in the gypsum-based coating material have a mean particle diameter of 50 μm or less, it becomes possible to form a thin and smooth coating film. Specifically, from the gypsum-based coating material, it is possible to form a coating film having, as a surface roughness, a ten point height of roughness Rz (μm) of 5 μm or less, preferably 3 μm or less, more preferably 2 μm or less, and still more preferably 1 μm or less, wherein the ten point average roughness Rz (μm) is specified by JIS B 0601:1982 (JIS B 0601:2013 Appendix JA). It is indicated that the lower the Rz value is, the smoother the surface of the coating film is. The lower limit of Rz is not particularly limited and can be made to be 0.1 μm or longer.

In addition, from the gypsum-based coating material according to the present embodiment, it is possible to form a coating film having a type D durometer hardness of 51 or more, more preferably 56 or more, wherein the type D durometer hardness is specified in JIS K 6253-3:2012. As respective values of the above described surface roughness and type D durometer hardness, values measured for a coating film obtained by applying the gypsum-based coating material on a gypsum board and drying and setting the applied gypsum-based coating material can be adopted.

Generally, applications of a gypsum-based coating material include a joint treatment material and a plastering material (for undercoating, for overcoating, and for both undercoating and overcoating). The gypsum composition for a drying type coating material and the gypsum-based coating material according to the present embodiment are constituted so as not to allow the hydration reaction of hemihydrate gypsum to occur, and therefore it is possible to prevent color unevenness attributable to the partial or non-uniform hydration reaction of hemihydrate gypsum. Thus, the gypsum composition and the gypsum-based coating material according to the present embodiment are suitable for being used as a material that appears on a surface or a material that is thinly formed, and from this viewpoint, the gypsum composition and the gypsum-based coating material according to the present embodiment are preferably used as a plastering material. Particularly, the gypsum composition and the gypsum-based coating material according to the present embodiment make it possible to form a thin and smooth coating film and therefore are more preferably used as a plastering material for overcoating or for both undercoating and overcoating, still more preferably for a plastering material for thin overcoating or for both thin undercoating and thin overcoating with a thickness of 3 mm or less.

The gypsum composition according to the present embodiment described above comprises hemihydrate gypsum and calcium carbonate each having a mean particle diameter of 50 μm or less, and a setting retarder, each in a particular ratio, and therefore makes it possible to form a thin and smooth coating film having a high surface hardness and makes it possible to suppress the hydration reaction of hemihydrate gypsum. Thus, when the gypsum-based coating material is obtained by adding water to the gypsum composition, it is possible to form a coating film in which the partial or non-uniform hydration reaction of hemihydrate gypsum is suppressed and in which hemihydrate gypsum is retained almost entirely or almost uniformly even though the coating film is a thin coating film that is excellent in scratch resistance and impact resistance. Accordingly, from the gypsum-based coating material obtained by adding water to the gypsum composition according to the present embodiment, a coating film in which color unevenness attributable to the partial or non-uniform hydration reaction of hemihydrate gypsum is suppressed can be formed.

In addition, hemihydrate gypsum and calcium carbonate each to be contained as main materials in the gypsum composition according to the present embodiment are white in color, and therefore the use of the gypsum-based coating material obtained by adding water to the gypsum composition makes it possible to form a thin and smooth lime plaster-like coating film. In the case where conventional lime plaster-based coating materials are used, the pH of the lime plaster-based coating materials is in a basic region, and besides, dust may scatter during working of applying a lime plaster-based coating material. Further, when the conventional lime plaster-based coating materials are directly applied, for example, on a gypsum board, lime plaster is difficult to adhere to the gypsum board, so that the coating film may peel off the base paper for the gypsum board, which exists on the surface of the gypsum board, or so that the color of the base paper for the gypsum board is transferred to the finished surface (for example, wall surface) on which the coating material is applied. In contrast, in the case where the gypsum composition according to the present embodiment is used, it is possible to easily prepare a gypsum-based coating material having a pH of 7 or more and less than 9, so that the safety is enhanced, and, in addition, the gypsum-based coating material easily adheres to a gypsum board and cloth (wall paper), so that it is possible to prevent the above-described color transfer. Therefore, the gypsum composition and the gypsum-based coating material according to the present embodiment is more suitably used for reforming interior decoration walls and exterior decoration walls of a building than lime plaster-based coating materials.

It is to be noted that the gypsum composition according to the present embodiment can be constituted as follows.

[1] A gypsum composition for a drying type coating material, the gypsum composition comprising: hemihydrate gypsum having a mean particle diameter of 50 μm or less; calcium carbonate having a mean particle diameter of 50 μm or less; and a setting retarder, wherein the gypsum composition has a content of the calcium carbonate of 10 to 400 parts by mass and a content of the setting retarder of 0.1 parts by mass or more each based on 100 parts by mass of the hemihydrate gypsum.

[2] The gypsum composition according to [1], wherein the hemihydrate gypsum has a mean particle diameter of 40 μm or less, and the calcium carbonate has a mean particle diameter of 40 μm or less.

[3] The gypsum composition according to [1] or [2], wherein the gypsum composition has a content of the calcium carbonate of 10 to 200 parts by mass based on 100 parts by mass of the hemihydrate gypsum.

[4] The gypsum composition according to any one of [1] to [3], wherein the gypsum composition has a content of the setting retarder of 0.1 to 10 parts by mass based on 100 parts by mass of the hemihydrate gypsum.

[5] The gypsum composition according to any one of [1] to [4], wherein the gypsum composition has a content of the setting retarder of 0.1 to 2 parts by mass based on 100 parts by mass of the hemihydrate gypsum.

[6] The gypsum composition according to any one of [1] to [5], wherein the setting retarder is at least one selected from the group consisting of citric acid, succinic acid, acetic acid, malic acid, ethylenediaminetetraacetic acid, diethylenetriaminepentaacetic acid, and salts thereof, and sucrose, starch, and decomposition products of protein.

[7] The gypsum composition according to any one of [1] to [6], wherein in powder X-ray diffraction, a coating film obtained by adding water to the gypsum composition for a coating material and then dry-setting a resultant mixture shows a diffraction peak originating from the hemihydrate gypsum and does not show a diffraction peak originating from dihydrate gypsum based on a hydration reaction of the hemihydrate gypsum.

[8] The gypsum composition according to any one of [1] to [7], wherein initial setting time of a hydration reaction that occurs when water is added to the gypsum composition for a coating material is 24 hours or longer.

In addition, the gypsum-based coating material according to the present embodiment can be constituted as follows.

[9] A drying type gypsum-based coating material comprising: hemihydrate gypsum having a mean particle diameter of 50 μm or less; calcium carbonate having a mean particle diameter of 50 μm or less; a setting retarder; and water, wherein the drying type gypsum-based coating material has a content of the calcium carbonate of 10 to 400 parts by mass and a content of the setting retarder of 0.1 parts by mass or more each based on 100 parts by mass of the hemihydrate gypsum.

[10] The gypsum-based coating material according to [9], comprising 30 to 60 parts by mass of the water based on 100 parts by mass of a total amount of the hemihydrate gypsum, the calcium carbonate, and the setting retarder.

[11] The gypsum-based coating material according to [9] or [10], having a pH of 7 or more and less than 9.

[12] The gypsum-based coating material according to any one of [9] to [11], wherein in powder X-ray diffraction, a coating film obtained by dry-setting the gypsum-based coating material shows a diffraction peak originating from the hemihydrate gypsum and does not show a diffraction peak originating from dihydrate gypsum based on a hydration reaction of the hemihydrate gypsum.

<Construction Method for Gypsum-Based Coating Material>

A construction method for a gypsum-based coating material according to one embodiment of the present invention comprises a step of applying a gypsum-based coating material on an adherend (hereinafter, sometimes referred to as "application step"). As a gypsum-based coating material in this construction method, the drying type gypsum-based coating material prepared by adding water to the gypsum composition for a coating material according to the previously described embodiment or the drying type gypsum-based coating material according to the previously described embodiment is used. Therefore, through the application step, a coating film in which the state of hemihydrate gypsum is kept can be formed, and more specifically, in powder X-ray diffraction measurement, it is possible to form a coating film which shows a diffraction peak originating from hemihydrate gypsum, which was contained in the gypsum-based coating material, and which does not show a diffraction peak originating from dihydrate gypsum based on the hydration reaction of the hemihydrate gypsum. Since such a coating film can be formed, the construction method for a gypsum-based coating material according to the present embodiment can suppress the color unevenness of a coating film formed from the gypsum-based coating material and can be adopted as a method for preventing the color unevenness of a coating film formed from the gypsum-based coating material.

As described above, in the construction method according to the present embodiment, the drying type gypsum-based coating material prepared by adding water to the gypsum composition according to the previously described embodiment can be used as a gypsum-based coating material. Therefore, the construction method according to the present embodiment may comprise a step of adding water to the gypsum composition for a coating material according to the previously described embodiment to prepare a drying type gypsum-based coating material (hereinafter, sometimes referred to as "preparation step"). In the preparation step, 30 to 60 parts by mass of water is preferably added to the gypsum composition based on 100 parts by mass of the total amount of hemihydrate gypsum, calcium carbonate, and the setting retarder.

The adherend (substrate) to be an object of applying the gypsum-based coating material according to the present embodiment is not particularly limited. Examples of the adherend (substrate) include cement and gypsum bases, woody bases, lime plaster walls, various plastic bases, and various metal bases. Specific examples of the cement and gypsum bases include gypsum boards, gypsum plaster, dolomite plaster, concrete, mud walls, diatomaceous earth walls, pulp cement boards, and woody cement boards (cemented excelsior boards and cemented chip boards). Specific examples of the woody bases include: woody boards such as plywood (veneer boards), woody fiberboards, and particle boards; laminated veneer lumber; and laminated wood. In addition, cloth may be adhered to the adherend (substrate), or various types of paints may be applied to the adherend (substrate). That is, according to the construction method of the present embodiment, by applying the previously described gypsum-based coating material on cloth (wall paper) or on the surface of a coating film of a paint, it is possible to reform walls (interior decoration walls and exterior decoration walls), floors, and ceilings of a building.

In the application step, the tool for use in applying the gypsum-based coating material on an adherend (substrate) is not particularly limited, and trowels (wood trowels and metal trowels) and the like that have been used for plastering materials up to now can be used. The amount of the gypsum-based coating material to be applied on an adherend in the application step is preferably 1.0 to 6.3 kg/m2. In addition, the coating thickness of the gypsum-based coating material on an adherend is preferably 0.5 to 3 mm.

The construction method according to the present embodiment preferably comprises a step of further providing a water-repellent coating film on the coating film formed through dry set of the gypsum-based coating material after the application step. By providing the water-repellent coating film on the coating film (gypsum-based coating film) formed from the gypsum-based coating material, absorption of water by the coating film after being formed the gypsum-based coating material can be suppressed. Therefore, it becomes possible to retain the coating film in which the state of hemihydrate gypsum is kept (more specifically, coating film which shows a diffraction peak originating from hemihydrate gypsum and which does not show a diffraction peak originating from dihydrate gypsum based on hydration reaction of the hemihydrate gypsum) over a long period of time stably.

The step of providing a water-repellent coating film on the gypsum-based coating film can be performed by applying a water-repellent paint on the gypsum-based coating film. As the water-repellent paint, conventional various materials that can impart water repellency and antifouling properties by being applied on lime plaster, gypsum plaster, a gypsum board, a calcium silicate board, or the like can be used. In addition, commercially available paints can also be used, and examples of the commercially available products include FJ150, FJ170, FJ171, FJ172 (all trade names, manufactured by TIGEREX Co., Ltd.). When FJ170, FJ171, FJ172, or the like is used, contamination resistance against oil spots and the like can also be imparted.

It is to be noted that even in the case where a subsequent step in which a water-repellent coating film is further provided accompanies the application step, drying type coating materials, such as lime plaster-based coating materials, that have conventionally been used can secure a sufficient workability in 2 to 6 hours after the coating material is applied on an adherend. With respect to the gypsum-based coating material according to one embodiment of the present invention, as well as the conventional drying type coating materials, the subsequent step can be conducted approximately in the same time as the above-described time.

A construction method for a gypsum-based coating material according to the present embodiment can be constituted as follows.

[13] A construction method for a gypsum-based coating material, the method comprising a step of applying a drying type gypsum-based coating material prepared by adding water to the gypsum composition for a coating material according to any one of [1] to [8] or applying the drying type gypsum-based coating material according to any one of [9] to [12] on an adherend.

[14] The construction method according to [13], wherein the amount of the gypsum-based coating material to be applied on the adherend is 1.0 to 6.3 kg/m$^2$.

[15] The construction method according to [13] or [14], wherein a coating thickness of the gypsum-based coating material on the adherend is 0.5 to 3 mm.

[16] The construction method according to any one of [13] to [15], comprising a step of further providing a water-repellent coating film on the coating film formed from the gypsum-based coating material.

EXAMPLES

Hereinafter, the present invention will be described more specifically giving Test Examples; however, the present invention is not limited to the following Test Examples. It is to be noted that "parts" and "%" in the following description are each on a mass basis unless otherwise noted.

<Preparation of Lime Plaster Composition and Lime Plaster Coating Material>

As a lime plaster composition, "MK Plaster (Overcoat)", trade name, manufactured by Murakashi Lime Industry Co., Ltd. was prepared. In Test Example 1, water was added to the lime plaster composition in a mixing water ratio of 80% (80 parts of water was added to 100 parts of lime plaster composition), and the resultant mixture was kneaded to prepare a lime plaster-based coating material for use in a test specimen 1.

<Preparation of Gypsum Compositions for Coating Material and of Gypsum-Based Coating Materials>

In Test Examples 2 to 20, respective components shown in upper rows in Tables 1 to 4 (units: parts by mass) were mixed and stirred sufficiently with a mixer to obtain gypsum compositions for a coating material each having a combination as shown in Tables 1 to 4 as gypsum compositions for a coating material to be used in test specimens 2 to 20. As the setting retarder, a commercially available decomposition product of protein in the form of a powder having a mean particle diameter of 20 μm was used in Test Examples 2 to 17, disodium ethylenediaminetetraacetate having a mean particle diameter of 20 μm was used in Test Example 18, sodium malate having a mean particle diameter of 20 μm was used in Test Example 19, and diethylenetriaminepentaacetic acid was used in Test Example 20. In addition, though not shown in Tables 1 to 4, in the gypsum compositions for a coating material to be used in the test specimens 2 to 20, 5 parts of an ethylene-vinyl acetate (EVA) copolymer (manufactured by Wacker Chemie AG, trade name "RE 546Z") was blended as a paste (binder) based on 100 parts (of total amount of hemihydrate gypsum, calcium carbonate, and setting retarder) of the gypsum composition for a coating material.

Water was added to each of the obtained gypsum compositions in a mixing water ratio of 40% (40 parts of water was added to 100 parts of gypsum composition) to prepare the gypsum-based coating materials to be used in the test specimens 2 to 20. In Test Example 19, the pH of the gypsum-based coating material was adjusted using slaked lime.

<Preparation of Test Specimens 1 to 20>

The surface of a gypsum board of 30 cm in length×30 cm in width (board thickness: 9.5 mm, manufactured by Yoshino Gypsum Co., Ltd., trade name "Tiger Board") was coated with each of the prepared coating materials using a trowel in a thickness of 1 mm. The amount of the coating material applied was set to 1.7 kg/m² per unit area of the gypsum board. The coating material applied on the gypsum board was dry-set at a temperature of 23° C. and a humidity of 50% RH for 24 hours to form a coating film. Each gypsum board on which the coating film was formed was dried to a constant weight in a dryer of 40° C. for 24 hours, thereby preparing the test specimens 1 to 20.

<Evaluation>

[pH]

For the lime plaster composition used in the test specimen 1 and the gypsum compositions used for the test specimens 2 to 20, 10 g of each composition was taken out and was then put into 200 ml of ion exchanged water. The pH of the composition 3 minutes after putting the composition into water was measured using a pH meter (trade name "pH METER HM-5S" manufactured by DKK-TOA CORPORATION). Evaluation was conducted based on the measured values of the pH according to the following criteria. The values of the pH measured using respective compositions and the evaluation results are shown in Tables 1 to 4.

A: pH is 7.0 or more and less than 8.0.
B: pH is 8.0 or more and less than 9.0.
C: pH is 9.0 or more.

[Surface Roughness]

The surface roughness that is specified in JIS B 0601: 1982 was measured using a surface roughness measurement instrument (trade name "Surftest 402" manufactured by Mitutoyo Corporation) for each of the test specimens 1 to 20. Evaluation was conducted using the measured ten point average roughness Rz (μm) according to the following criteria. It is indicated that the lower the Rz value is, the smoother the surface of the coating film is. The values of Rz and evaluation results for respective specimens are shown in Tables 1 to 4.

A: Rz is less than 2.0 μm.
B: Rz is 2.0 μm or more and less than 5.0 μm.
C: Rz is 5.0 μm or more.

[Surface Hardness]

The surface hardness was measured using a rubber hardness meter (Type D manufactured by TECLOCK Corporation) for the surface of each coating film on test specimens 1 to 20. Specifically, the rubber hardness meter was pressed on the surface of the coating film on each test specimen to measure the type D durometer hardness (hereinafter, written as "type D hardness") in accordance with the specification in JIS K 6253-3:2012. Evaluation was conducted based on the measured values of the type D hardness of respective test specimens according to the following criteria. The surface hardness and the evaluation result for respective test specimens are shown in Tables 1 to 4.

A: type D hardness is 56 or more.
B: type D hardness is 51 or more and less than 56.
C: type D hardness is less than 51.

[X-ray Diffraction]

Whether dihydrate gypsum is present or not was checked by X-ray diffraction of the coating film on each test specimen. An X-ray diffraction apparatus (trade name "LabX XRD-6100" manufactured by SHIMADZU CORPORATION) was used for the X-ray diffraction. The entire surface of the coating film on the test specimen was shaved off with a scraper, and a powder of the coating film shaved off the entire surface of the coating film was filled in a holder exclusively for the X-ray diffraction apparatus to measure an X-ray diffraction pattern in a range of a diffraction angle (2θ angle (θ: angle of incidence) from 10° to 16°. The measurement conditions were set as follows; target: Cu, Filter: Ni, voltage: 30 V, current: 10 mA, and scanning speed: 1°/min.

Figure 1:
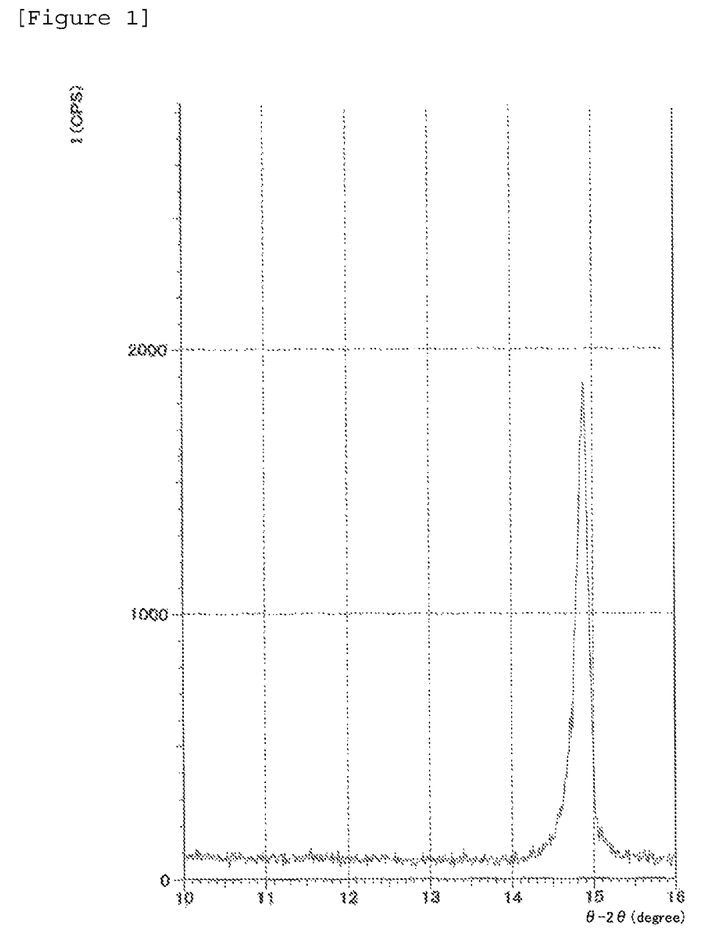
FIG. 1 shows a powder X-ray diffraction pattern of a gypsum-based coating film of test specimen 2.
Figure 2:
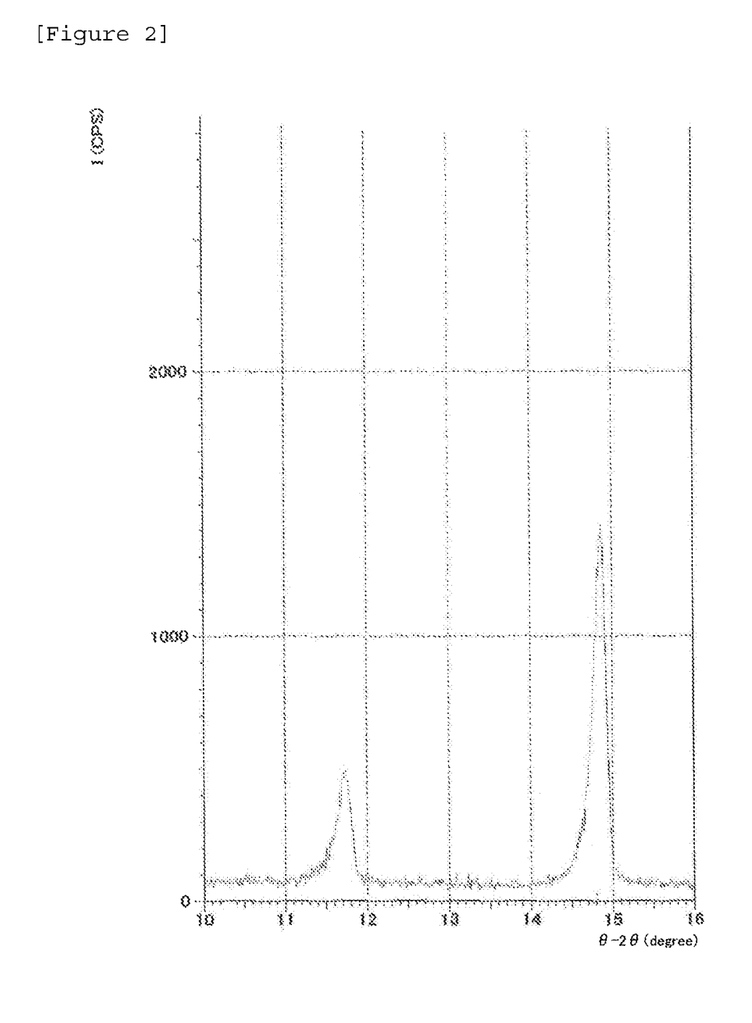
FIG. 2 shows a powder X-ray diffraction pattern of a gypsum-based coating film of test specimen 12.

It is known that in an X-ray diffraction pattern, a clear peak originating from dihydrate gypsum appears at a diffraction angle of 11 to 12°, and a clear peak originating from hemihydrate gypsum appears at a diffraction angle of 14 to 15°. Based on this fact, whether dihydrate gypsum is present or not (that is, whether the X-ray diffraction pattern has a peak at a diffraction angle of 11 to 12° or not) was checked, and whether hemihydrate gypsum is present or not (that is, the X-ray diffraction pattern has a diffraction peak at a diffraction angle of 14 to 15°) was checked in the obtained X-ray diffraction patterns. In Tables 1 to 4, whether the peak originating from hemihydrate gypsum is present or not and whether the peak originating from dihydrate gypsum or not are each shown. As examples, a powder X-ray diffraction pattern of the coating film taken from the test specimen 2 is shown in FIG. 1, and a powder X-ray diffraction pattern of the coating film taken from the test specimen 12 is shown in FIG. 2. It is to be noted that the powder X-ray diffraction pattern as shown in FIG. 1 was ascertained for each coating film taken from the test specimens 3 to 11 and 14 to 20, and the powder X-ray diffraction pattern as shown in FIG. 2 was ascertained for the coating film taken from the test specimen 13.

In addition, in the case where the peak originating from dihydrate gypsum is present in the X-ray diffraction pattern, the existence of dihydrate gypsum based on the hydration reaction of hemihydrate gypsum is indicated. In this case, there is a possibility that the partial or non-uniform hydration reaction of hemihydrate gypsum occurs, and therefore evaluation is that such a case can be a cause for color unevenness in the coating film, so that the evaluation result is described as "Poor" in the "Evaluation of color unevenness" fields in Tables 1 to 4. Conversely, in the case where the peak originating from dihydrate gypsum is not present in the X-ray diffraction pattern, evaluation is that preventing color unevenness in the coating film is possible, so that evaluation result was described as "Good" in the "Evaluation of color unevenness" fields in Tables 1 to 4.

TABLE 1

| | | | Test Example No. (Test Specimen No.) | | | | |
|---|---|---|---|---|---|---|---|
| | | | 1 | 2 | 3 | 4 | 5 |
| *1 | Hemihydrate gypsum | 20 μm | | 100 | | | |
| | | 40 μm | | | 100 | | |
| | | 50 μm | | | | 100 | |
| | | 70 μm | | | | | 100 |

TABLE 1-continued

|  |  |  | Test Example No. (Test Specimen No.) | | | | |
| --- | --- | --- | --- | --- | --- | --- | --- |
|  |  |  | 1 | 2 | 3 | 4 | 5 |
|  | Calcium carbonate | 20 μm |  | 100 |  |  |  |
|  |  | 40 μm |  |  | 100 |  |  |
|  |  | 50 μm |  |  |  | 100 |  |
|  |  | 70 μm |  |  |  |  | 100 |
|  | Lime plaster | 20 μm | 100 |  |  |  |  |
|  | Setting retarder | 20 μm |  | 0.3 | 0.3 | 0.3 | 0.3 |
| *2 | pH | pH value | 12.5 | 7.5 | 7.5 | 7.5 | 7.5 |
|  |  | Evaluation | C | A | A | A | A |
|  | Surface roughness | Rz (μm) | 0.8 | 0.5 | 1.8 | 2.3 | 8 |
|  |  | Evaluation | A | A | A | B | C |
|  | Surface hardness | Type D hardness | 55 | 60 | 57 | 55 | 49 |
|  |  | Evaluation | B | A | A | B | C |
|  | X-ray diffraction | Peak originating from hemihydrate gypsum | Not Present | Present | Present | Present | Present |
|  |  | Peak originating from dihydrate gypsum | Not present | Not present | Not present | Not present | Not Present |
|  |  | Evaluation of color unevenness | Good | Good | Good | Good | Good |

*1: Components and mean particle diameters thereof
*2: Evaluation results

TABLE 2

|  |  |  | Test Example No. (Test Specimen No.) | | | | | |
| --- | --- | --- | --- | --- | --- | --- | --- | --- |
|  |  |  | 6 | 7 | 8 | 9 | 10 | 11 |
| *1 | Hemihydrate gypsum | 20 μm | 100 | 100 | 100 | 100 | 100 | 100 |
|  |  | 40 μm |  |  |  |  |  |  |
|  |  | 50 μm |  |  |  |  |  |  |
|  |  | 70 μm |  |  |  |  |  |  |
|  | Calcium carbonate | 20 μm | 0 | 10 | 50 | 200 | 400 | 500 |
|  |  | 40 μm |  |  |  |  |  |  |
|  |  | 50 μm |  |  |  |  |  |  |
|  |  | 70 μm |  |  |  |  |  |  |
|  | Lime plaster | 20 μm |  |  |  |  |  |  |
|  | Setting retarder | 20 μm | 0.3 | 0.3 | 0.3 | 0.3 | 0.3 | 0.3 |
| *2 | pH | pH value | 7.5 | 7.5 | 7.6 | 7.9 | 8.1 | 8.3 |
|  |  | Evaluation | A | A | A | A | B | B |
|  | Surface roughness | Rz (μm) | 6.3 | 0.7 | 0.6 | 0.7 | 0.6 | 10.3 |
|  |  | Evaluation | C | A | A | A | A | C |
|  | Surface hardness | Type D hardness | 63 | 61 | 63 | 61 | 57 | 50 |
|  |  | Evaluation | A | A | A | A | A | C |
|  | X-ray diffraction | Peak originating from hemihydrate gypsum | Present | Present | Present | Present | Present | Present |
|  |  | Peak originating from dihydrate gypsum | Not present | Not present | Not present | Not present | Not Present | Not present |
|  |  | Evaluation of color unevenness | Good | Good | Good | Good | Good | Good |

*1: Components and mean particle diameters thereof
*2: Evaluation results

TABLE 3

|  |  |  | Test Example No. (Test Specimen No.) | | | | | |
| --- | --- | --- | --- | --- | --- | --- | --- | --- |
|  |  |  | 12 | 13 | 14 | 15 | 16 | 17 |
| *1 | Hemihydrate gypsum | 20 μm | 100 | 100 | 100 | 100 | 100 | 100 |
|  |  | 40 μm |  |  |  |  |  |  |
|  |  | 50 μm |  |  |  |  |  |  |
|  |  | 70 μm |  |  |  |  |  |  |
|  | Calcium carbonate | 20 μm | 100 | 100 | 100 | 100 | 100 | 100 |
|  |  | 40 μm |  |  |  |  |  |  |
|  |  | 50 μm |  |  |  |  |  |  |
|  |  | 70 μm |  |  |  |  |  |  |
|  | Lime plaster | 20 μm |  |  |  |  |  |  |
|  | Setting retarder | 20 μm | 0 | 0.07 | 0.1 | 2 | 10 | 15 |
| *2 | pH | pH value | 7.5 | 7.5 | 7.3 | 7.8 | 7.5 | 7.8 |
|  |  | Evaluation | A | A | A | A | A | A |

TABLE 3-continued

| | | \multicolumn{6}{c}{Test Example No. (Test Specimen No.)} | | | | | |
|---|---|---|---|---|---|---|---|
| | | 12 | 13 | 14 | 15 | 16 | 17 |
| Surface roughness | Rz (μm) | 0.3 | 0.5 | 0.5 | 0.5 | 0.5 | 0.7 |
| | Evaluation | A | A | A | A | A | A |
| Surface hardness | Type D hardness | 70 | 67 | 64 | 60 | 60 | 60 |
| | Evaluation | A | A | A | A | A | A |
| X-ray diffraction | Peak originating from hemihydrate gypsum | Present | Present | Present | Present | Present | Present |
| | Peak originating from dihydrate gypsum | Present | Present | Not present | Not present | Not Present | Not present |
| | Evaluation of color unevenness | Poor | Poor | Good | Good | Good | Good |

*1: Components and mean particle diameters thereof
*2: Evaluation results

TABLE 4

| | | | Test Example No. (Test Specimen No.) | | |
|---|---|---|---|---|---|
| | | | 18 | 19 | 20 |
| *1 Hemihydrate gypsum | | 20 μm | 100 | 100 | 100 |
| | | 40 μm | | | |
| | | 50 μm | | | |
| | | 70 μm | | | |
| Calcium carbonate | | 20 μm | 100 | 100 | 100 |
| | | 40 μm | | | |
| | | 50 μm | | | |
| | | 70 μm | | | |
| Disodium ethylenediaminetetraacetate | | 20 μm | 0.3 | | |
| Sodium malate | | 20 μm | | 0.8 | |
| | Diethylenetriaminepentaacetic acid | | | | 0.3 |
| | pH Aduster (Slaked lime) | | | 0.1 | |
| *2 pH | | pH value | 7.5 | 7.8 | 7.4 |
| | | Evaluation | A | A | A |
| Surface roughness | | Rz (μm) | 0.5 | 0.5 | 0.5 |
| | | Evaluation | A | A | A |
| Surface hardness | | Type D hardness | 57 | 58 | 60 |
| | | Evaluation | A | A | A |
| X-ray diffraction | | Peak originating from hemihydrate gypsum | Present | Present | Present |
| | | Peak originating from dihydrate gypsum | Not Present | Not Present | Not present |
| | | Evaluation of color unevenness | Good | Good | Good |

*1 Components and mean particle diameters thereof
*2 Evaluation results

From the above evaluation results for the test specimens 1 to 20, it was ascertained that a coating film that has a high surface hardness and that makes it possible to suppress color unevenness even though the coating film is thin and smooth can be formed from the gypsum composition comprising 100 parts of hemihydrate gypsum having a mean particle diameter of 50 μm or less, 10 to 400 parts of calcium carbonate having a mean particle diameter of 50 μm or less, and 0.1 parts by mass or more of a setting retarder (test specimens 2 to 4, 7 to 10, and 14 to 20). In addition, test specimens were each prepared in the same manner as in test specimen 2 using sodium citrate, sodium succinate, sodium acetate, sucrose, or starch in place of the decomposition product of protein used as the setting retarder in the gypsum composition for a coating material and the gypsum-based coating material each used in the test specimen 2. The pH of the gypsum composition used for each of the test specimens, and the surface roughness, surface hardness, and powder X-ray diffraction for each test specimen were measured by the above-described methods, and it was ascertained that the results which were almost the same as those for the test specimen 2 were obtained.

It is to be noted that on the test specimen 6 prepared using the gypsum composition not containing calcium carbonate, a coating film having a rough surface was formed. It is considered that this is because when the gypsum-based coating material prepared by adding water to the gypsum composition in the preparation of the test specimen 6 was applied on the gypsum board, the gypsum-based coating material became sticky, so that separation of the gypsum-based coating material from the trowel was poor.

On the test specimen 11 prepared using the gypsum composition comprising 500 parts of calcium carbonate based on 100 parts of hemihydrate gypsum, a coating film having a rough surface and having a low surface harness was formed. It is considered that this is because waves produced by the trowel in performing trowel coating on the gypsum board with the gypsum-based coating material prepared by adding water to the gypsum composition in the preparation of the test specimen 11 were difficult to disappear even when the waves are pressed by the trowel. It is inferred that the cause that the waves produced by the trowel were difficult to disappear is because the excess amount of calcium carbonate unevenly exists on the surface layer side in the process of forming the coating film to make the surface layer side of the coating film in the middle of being formed harder.

With respect to the test specimen 12 prepared using the gypsum composition not containing a setting retarder and the test specimen 13 prepared using the gypsum composition comprising 0.07 parts of the setting retarder based on 100 parts of hemihydrate gypsum, a diffraction peak originating from hemihydrate gypsum and a diffraction peak originating from dihydrate gypsum were ascertained in the powder X-ray diffraction patterns of the coating films. Accordingly, it was shown that in test specimens 12 and 13, hemihydrate gypsum partially undergoes the hydration reaction and a coating film in which color unevenness is liable to occur is formed.

In addition, with respect to the test specimens 2 to 4, 7 to 10, and 14 to 20, the initial setting time of the hydration reaction was measured up to 24 hours and 48 hours in accordance with JIS A 6904 except that the normal consistency described in JIS A 6904 was set to a penetration depth of 20±2 mm. As a result, the position where the needle used for the measurement stopped was 0 mm from the bottom of a container in which the gypsum-based coating material was placed both after the elapse of 24 hours and after the elapse of 48 hours. From this result and further, from the fact that thin coating was performed such that the coating thickness of the gypsum-based coating material in preparing the above-described test specimens was 3 mm or less, it is considered that in the above-described test specimens, the coating film was formed through dry set in a state where the gypsum-based coating material did not undergo hydration reaction and water in the gypsum-based coating material was absorbed by the adherend and evaporated into the air. This means that the coating film was formed in a state where the dry set completion time is faster than the initial setting time of the hydration reaction of the gypsum-based coating material.

The invention claimed is:

1. A gypsum composition for a coating material for forming a coating film through drying the coating material, the gypsum composition comprising:
    hemihydrate gypsum having a mean particle diameter in a range of 50 μm or less;
    calcium carbonate having a mean particle diameter in a range of 50 μm or less; and
    a setting retarder,
    wherein
    the gypsum composition has a content of the calcium carbonate in a range from 10 to 400 parts by mass and a content of the setting retarder in a range of 0.1 parts by mass or more each relative to 100 parts by mass of the hemihydrate gypsum,
    the hemihydrate gypsum comprises at least one material selected from the group consisting of α-hemihydrate gypsum, β-hemihydrate gypsum, and III-anhydrous gypsum, and
    initial setting time of a hydration reaction that occurs when water is added to the gypsum composition so as to form a coating material is in a range of 24 hours or longer,
        wherein the initial setting time of the hydration reaction is measured according to JIS A 6904, except that normal consistency in the JIS A 6904 is set at a penetration depth of 20±2 mm, and
        the initial setting time of the hydration reaction corresponds to an initial setting in the JIS A 6904.

2. The gypsum composition for a coating material according to claim 1,
    wherein the hemihydrate gypsum has the mean particle diameter in a range of 40 μm or less, and
    the calcium carbonate has the mean particle diameter in a range of 40 μm or less.

3. The gypsum composition for a coating material according to claim 1,
    wherein the gypsum composition has the content of the calcium carbonate in a range from 10 to 200 parts by mass relative to 100 parts by mass of the hemihydrate gypsum.

4. The gypsum composition for a coating material according to claim 1,
    wherein the gypsum composition has the content of the setting retarder in a range from 0.1 to 10 parts by mass relative to 100 parts by mass of the hemihydrate gypsum.

5. The gypsum composition for a coating material according to claim 1,
    wherein the gypsum composition has the content of the setting retarder in a range from 0.1 to 2 parts by mass relative to 100 parts by mass of the hemihydrate gypsum.

6. The gypsum composition for a coating material according to claim 1,
    wherein the setting retarder is at least one material selected from the group consisting of citric acid, succinic acid, acetic acid, malic acid, ethylenediaminetetraacetic acid, diethylenetriaminepentaacetic acid, and salts thereof, and sucrose, starch, and decomposition products of protein.

7. The gypsum composition for a coating material according to claim 1,
    wherein powder X-ray diffraction of the coating film, which is obtained by adding water to the gypsum composition for a coating material and then dry-setting a resultant mixture, shows a diffraction peak originating from the hemihydrate gypsum but does not show a diffraction peak originating from dihydrate gypsum formed by a hydration reaction of the hemihydrate gypsum.

8. The gypsum composition for a coating material according to claim 1,
    wherein the initial setting time is in a range of 48 hours or longer.

9. The gypsum composition for a coating material according to claim 1,
    wherein the content of the calcium carbonate in the gypsum composition is in a range from 50 to 400 parts by mass relative to 100 parts by mass of the hemihydrate gypsum.

10. A gypsum-based coating material comprising:
    hemihydrate gypsum having a mean particle diameter in a range of 50 μm or less;
    calcium carbonate having a mean particle diameter in a range of 50 μm or less;
    a setting retarder; and
    water,
    wherein the gypsum-based coating material forms a coating film through drying the coating material,
    the gypsum-based coating material has a content of the calcium carbonate in a range from 10 to 400 parts by mass and a content of the setting retarder in a range of 0.1 parts by mass or more each relative to 100 parts by mass of the hemihydrate gypsum,
    the hemihydrate gypsum comprises at least one material selected from the group consisting of α-hemihydrate gypsum, β-hemihydrate gypsum, and III-anhydrous gypsum, and
    initial setting time of a hydration reaction that occurs when water is added to a combination of the hemihydrate gypsum, the calcium carbonate, and the setting retarder so as to form the gypsum-based coating material is in a range of 24 hours or longer,
wherein the initial setting time of the hydration reaction is measured according to JIS A 6904, except that normal consistency in the JIS A 6904 is set at a penetration depth of 20±2 mm, and
the initial setting time of the hydration reaction corresponds to an initial setting in the JIS A 6904.

11. The gypsum-based coating material according to claim 10, comprising the water in a range from 30 to 60 parts by mass relative to 100 parts by mass of a total amount of the combination of the hemihydrate gypsum, the calcium carbonate, and the setting retarder.

12. The gypsum-based coating material according to claim 10, having a pH in a range of 7 or more and less than 9.

13. The gypsum-based coating material according to claim 10,
wherein powder X-ray diffraction of the coating film, which is obtained by dry-setting the gypsum-based coating material, shows a diffraction peak originating from the hemihydrate gypsum but does not show a diffraction peak originating from dihydrate gypsum formed by a hydration reaction of the hemihydrate gypsum.

14. The gypsum-based coating material according to claim 10,
wherein the initial setting time is in a range of 48 hours or longer.

15. The gypsum-based coating material according to claim 10,
wherein the content of the calcium carbonate in the combination of the hemihydrate gypsum, the calcium carbonate, and the setting retarder is in a range from 50 to 400 parts by mass relative to 100 parts by mass of the hemihydrate gypsum.

16. A construction method for forming a coating film with a gypsum-based coating material, the method comprising:
applying the gypsum-based coating material according to claim 10 on an adherend as a substrate for the gypsum-based coating material; and
drying the coated gypsum-based coating material so as to form the coating film on the adherend.

17. The construction method according to claim 16,
wherein an amount of the gypsum-based coating material applied on the adherend is in a range from 1.0 to 6.3 kg/m$^2$.

18. The construction method according to claim 16,
wherein a coating thickness of the gypsum-based coating material applied on the adherend is in a range from 0.5 to 3 mm.

19. The construction method according to claim 16, the method further comprising forming a water-repellent coating film on the coating film formed of the gypsum-based coating material.

20. The construction method according to claim 16,
wherein the adherend is at least one material selected from the group consisting of cement bases, gypsum bases, woody bases, lime plaster walls, plastic bases, and metal bases.

* * * * *